United States Patent Office 3,574,788
Patented Apr. 13, 1971

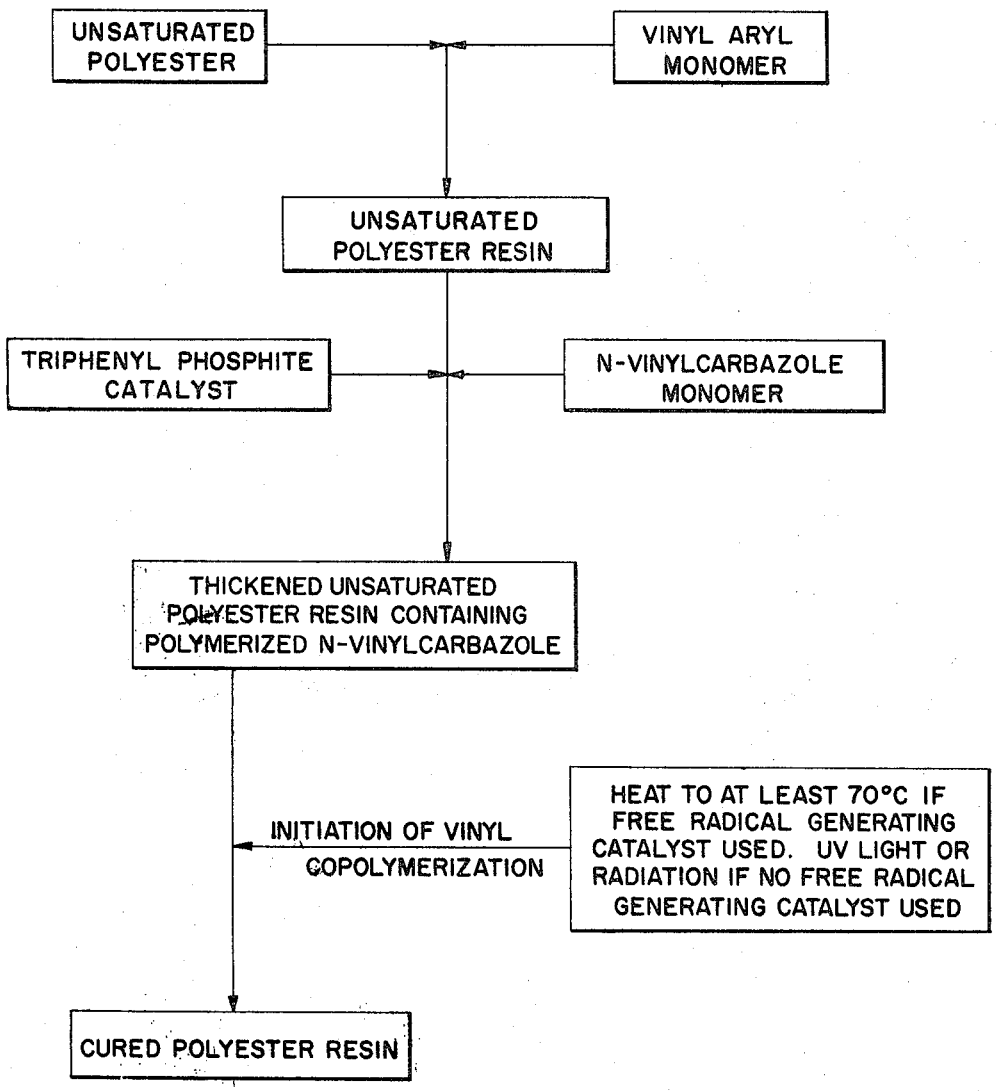

3,574,788
THICKENABLE UNSATURATED POLYESTER RESIN SYSTEM
Melvin E. Baum, Monroeville, Pa., assignor to Koppers Company, Inc.
Filed Sept. 18, 1967, Ser. No. 668,585
Int. Cl. C08f *21/02*
U.S. Cl. 260—865                      1 Claim

ABSTRACT OF THE DISCLOSURE

An unsaturated polyester resin system capable of being chemically thickened comprises: (1) an unsaturated polyester; (2) a copolymerizable vinyl aryl monomer; (3) N-vinylcarbazole; and (4) triphenyl phosphite. The system is chemically thickened by the polymerization of the N-vinylcarbazole which is catalyzed by the triphenyl phosphite. The system is, therefore, thickened before initiation of the vinyl copolymerization between the unsaturated polyester and the copolymerizable vinyl aryl monomer.

BACKGROUND OF THE INVENTION

Cured unsaturated polyester resins which have been reinforced by fibrous material such as glass fiber mats or the like have excellent physical strength characteristics. However, the formation of shaped objects with such materials has presented problems because the fibers initially immersed within the uncured liquid resin tend to rise to the surface causing the object after curing of the resin, to have irregularities in the surface.

To avoid this problem, preforms have been made by spraying glass fibers onto screens similar in shape to the final desired product. Air is sucked through the screen to hold the fibers in place. A binder is then sprayed over the fibers, and cured to hold the fibers together in the desired form. The form is then placed into a mold and the unsaturated polyester resin is poured into the mold and cured therein. The resin must be viscous enough to adhere to the form, yet not so viscous to prevent proper wetting of the fibers.

To overcome the foregoing cumbersome and critical process, it has been proposed to coat the glass fibers with the uncured, unsaturated polyester resin liquid to thoroughly wet the fibers. The liquid resin is then thickened, without actually curing the resin, by chemical or physical means. The physical means include: (1) driving off the volatile solvent in which a viscous polyester resin has been dissolved, or (2) using a heated viscous polyester resin then cooling the coated fiber after application. The chemical means: (1) the addition of a thickening agent such as MgO to the polyester resin, or (2) the partial copolymerization or curing of the resin to a gelled or B-stage. Fibrous reinforcements can thus be pre-coated with a low viscosity thickenable polyester resin which will therefore properly wet the fibers, yet the polyester resin coatings will rapidly lose its tacky state by the increase in viscosity enhancing the storability of the pre-coated fibers. Thus, the use of preforms is eliminated as well as the attendant mess of coating the irregular-shaped preform with a liquid resin. Glass fiber mats coated with such resins may be easily handled and charged to molding machines. More positive control of the amount of charge as well as the shape of the charge can thus be maintained resulting in higher quality molded products as well as economic savings.

However, such systems each have certain economic drawbacks. The solvent system, of course, results in loss of the solvent plus disposal of the fume. Heating viscous polyesters to reduce their viscosity is costly and cumbersome. Chemical thickening the polyester resin such as by the addition of MgO or Mg(OH)$_2$ as shown in U.S. Patent 2,568,331 issued to Vincent Frilette results in an eventual viscosity build-up; however, one of its drawbacks is that the initial thickening rapidly builds up the viscosity which reduces the pot life of the resin. Another difficulty encountered is the slow overall build-up of viscosity of the resin. On the other hand, resins modified to rapidly cure to the B-stage have a tendency to continue to cure or harden beyond the B-stage within a short period of time. The B-stage actually represents an intermediate stage of the vinyl copolymerization or curing of the resin.

SUMMARY OF THE INVENTION

Quite surprisingly, I have discovered a chemically thickenable polyester resin system which comprises the addition of a polymerizable N-vinylcarbazole monomer to a polyester resin, containing a copolymerizable vinyl aryl monomer such as styrene. The polymerization of the N-vinylcarbazole monomer is catalyzed by a phosphite catalyst which does not catalyze the vinyl copolymerization of the polyester with the vinyl aryl monomer.

In accordance with the invention, a curable unsaturated polyester resin system which increases in viscosity after formation of the system, comprises: (a) an unsaturated polyester formed by condensing in approximately equimolar proportions: (1) at least one dicarboxylic acid at least a portion of which contains alpha, beta-ethylenic unsaturation with (2) at least one dihydric alcohol; (b) a copolymerizable vinyl aryl monomer; (c) N-vinylcarbazole monomer; and (d) triphenyl phosphite. The triphenyl phosphite acts as a catalyst for the polymerization of the N-vinylcarbazole. The polymerization of the N-vinylcarzabole results in an increase of the viscosity of the system before the subsequent curing of the resin caused by the polymerization of the unsaturated polyester and the vinyl aryl monomer.

DESCRIPTION OF THE DRAWING

The drawing is a flow sheet which illustrates schematically the invention which is described in detail below.

DETAILED DESCRIPTION

As previously described, in accordance with the invention, an unsaturated polyester resin system is thickened by the addition of N-vinylcarbazole and triphenyl phosphite. The triphenyl phosphite catalyzes the polymerization of the N-vinylcarbazole, but does not initiate the vinyl copolymerization of the unsaturated polyester with the vinyl aryl monomer.

The term "unsaturated polyester" as used herein is defined as the condensation polymer produced by condensing approximately equimolar proportions of at least one dicarboxylic acid, at least a portion of which contains alpha, beta-ethylenic unsaturation, with at least one dihydric alcohol. The term "unsaturated polyester resin" as used herein is meant to define a combination of a condensation polymer or unsaturated polymer and a vinyl aryl monomer such as styrene, which may be copolymerized with the unsaturated polyester. Before copolymerization, the monomer-polyester mixture may be referred to as an uncured polyester resin and after the copolymerization, as a cured polyester resin.

Unsaturated polyester resins are well known in the art. (See, for example, U.S. Patent 2,255,313 issued to Carleton Ellis). The unsaturated polyester portion of the resin is a condensation polymer formed by polyesterifying dicarboxylic acids with dihydric alcohols. To provide unsaturation within the polyester, at least a portion of the dicarboxylic acid must contain alpha, beta-ethylenic unsaturation. Examples of such unsaturated dicarboxylic acids include maleic, fumaric acids as well as maleic anhydride. The remainder of the dicarboxylic acids are usually either saturated normal aliphatics such as adipic acid, succinic acid or the like, or aromatic diacids such as phthalic acid, isophthalic acid, or the like, as well as their halogenated derivatives such as tetrochlorophthalic anhydride.

Examples of common dihydric alcohols used in the polyesterification are ethylene glycol, 1,2-propane diol (propylene glycol) and the ether glycols, such as diethylene glycol, dipropylene glycol, or the like. The cyclic glycols such as 1,4-cyclohexane diol or the adducts or reaction products of alkylene oxides with bis-phenol A are also well-known constituents of polyesterification products which may be used in the unsaturated polyester resin of the invention.

The dicarboxylic acids and dihydric alcohols are reacted together in approximately equimolar proportions to form a polyester. The average molecular weight of the polymer is most conveniently measured with respect to the acid end groups. A gram of the polyester is titrated with KOH and the number of milligrams of KOH necessary to neutralize the gram of polyester is called the acid number of the polyester. Acid numbers below 100 usually signify polyesters having sufficient molecular weight to possess good physical properties. Therefore, the unsaturated polyesters useful in the invention are those possessing a molecular weight indicated by an acid number below about 100.

Unsaturated polyesters are conventionally dissolved in a copolymerizable vinyl aryl monomer such as styrene or vinyl toluene. The amount of monomer used generally is about 10–60% and preferably 20–50% by weight of the total polyester resin. Illustrative of such copolymerizable vinyl aryl monomers are the vinyl phenyl monomers such as styrene alpha-methyl styrene, chlorostyrene, vinyl toluene, divinyl benzene, and the like. The unsaturated polyester resin is subsequently cured by copolymerization of the unsaturated polyester and the vinyl aryl monomer. Initiation of this copolymerization is usually effected by use of a free radical generating catalyst such as, for example, a peroxide catalyst, although UV light, or radiation, or the like are also less frequently used.

The additional monomer N-vinylcarbazole is polymerized by a separate catalyst, triphenyl phosphite, which does not initiate the copolymerization of the unsaturated polyester with the vinyl aryl monomer. Thus, the use of a high temperature free radical generating catalyst such as benzoyl peroxide to initiate the copolymerization of the unsaturated polyester with the vinyl aryl monomer, or the omission of a catalyst altogether in favor of UV light or radiation copolymerization, initiation enables one to polymerize the N-vinylcarbazole at room temperature with a triphenyl phosphite catalyst to thicken the entire system and then at a subsequent time, to initiate the vinyl copolymerization of the polyester and vinyl aryl monomer by heating the system to a temperature high enough to activate the high temperature free radical generating catalyst, or, if no free radical generating catalyst is used, to subject the system to ultraviolet light or radiation to initiate the vinyl copolymerization of the resin.

The condensation polymer of unsaturated polyester to monomer weight ratios in unsaturated polyester resin may vary from 90% polymer–10% monomer to as high as 40% polymer–60% monomer. Because the N-vinylcarbazole is independently polymerized with itself and is, therefore, unavailable to any effective extent as a coreactive ingredient in the subsequent vinyl copolymerization, the system must always contain a vinyl aryl monomer such as styrene to copolymerize with the unsaturated polyester. However, since the physical properties of a polyester resin are normally dependent upon the ester or condensation polymer present, the physical properties can be detrimentally influenced by the presence of excessive amounts of monomers. Therefore, about 50% monomer is normally considered to be the maximum amount; although, in certain instances, depending upon the particular polyester, monomer amounts as high as 60% can be used. Because of these limitations, the presence of the additional monomer (N-vinylcarbazole) requires a reduction of the amount of vinyl aryl monomer used in the system. It has been found that excellent results are achieved, for example, if the total sum of the monomeric content is from 10–60%, preferably 30–50%, of the total weight of the polyester resin. In accordance with the invention, about 3–25% and preferably 3–15% by weight N-vinylcarbazole is the range for this monomer with the balance of the monomeric content to be vinyl aryl monomer. Regardless of the amount of N-vinylcarbazole used within this range, however, at least 10–20% by weight vinyl aryl monomer must also be used to insure adequate vinyl copolymerization in the subsequent curing step.

As mentioned previously, unsaturated polyester resins are conventionally cured by the vinyl copolymerization of the unsaturated polyester and the vinyl aryl monomer across the ethylenic double bond contained in each. The initiation of this copolymerization is usually effected by the use of free radical generating catalyst such as, for example, a peroxide catalyst; although, UV light, or radiation, or the like are also less frequently used. As with conventional unsaturated polyester resins, the unsaturated polyester resin system of the invention is also subsequently cured by vinyl copolymerization of the unsaturated polyester and unsaturated monomer. However, because of the chemical thickening mechanism used in the system of the invention and its utility in thickening the polyester resin without the initiation of the vinyl copolymerization, the preferred practice in initiating the subsequent vinyl copolymerization is to either utilize a high temperature catalyst or to omit the catalyst entirely and rely on external free radical initiating means such as UV light, radiation or the like. In this way, the unsaturated polyester resin is chemically thickened via the polymerization of the N-vinylcarbazole, yet the system has very long shelf life because the vinyl copolymerization or curing is not commenced until the input of the additional light or heat energy or the like to initiate the free radical vinyl polymerization.

Examples of high temperature peroxide catalysts which can be used to initiate the copolymerization include benzoyl peroxide, cumene hydroperoxide, di-t-butyl peroxide, t-butyl perbenzoate, dicumyl peroxide, 2,5-dimethylhexane-2,5-dihydroperoxide, t-butylhydro peroxide, p-methane hydroperoxide, pinane hydroperoxide, and the like. Other high temperature free radical generating catalyst which can also be used include, for example, 2,2'-azobisisobutyronitrile. The term "high temperature catalyst" as herein used is intended to define an agent catalytically inactive below about 70° C.

The N-vinylcarbazole polymerization is catalyzed by triphenyl phosphite. The choice of this particular catalyst is dictated by the need for a catalyst which will polymerize the N-vinylcarbazole without initiating the vinyl copolymerization. Furthermore, the triphenyl phosphite catalyst has been found to be unaffected by the presence of vinyl aryl monomers such as styrene. In contrast, other known N-vinylcarbazole polymerization catalysts such as triallyl phosphate were ineffective in the presence of styrene. The amount of this catalyst to be added to the system ranges from 0.5% to 5% by weight, based on total weight of the system. Amounts below 0.5% are not sufficiently effective to polymerize the N-vinylcarbazole as rapidly as is desirable. The preferred range is actually about 1–2%, however, amounts up to 5% find additional utility not only as a catalyst for polymerization of the N-vinylcarbazole, but as a fire-retardant additive as well. Such higher amounts are particularly effective when used in connection with a polyester resin system designed to be fire retardant or self-extinguishing such as, for example, by the incorporation of a halogenated compound in the polyester itself such as the use of tetrachlorophthalic anhydride or tetrobromophthalic anhydride, as a portion of the dicarboxylic acid content in the polyester.

curing of the solidified samples at 135° C. gave a hard clear casting in each case. The physical properties of the cured samples were determined as tabulated below:

TABLE I

| | | Flexural | | Tensile | | | Compressive | | | Izod, ft.lb.-/ inch. notch |
|---|---|---|---|---|---|---|---|---|---|---|
| | Barcol | Strength p.s.i. | Modulus 10⁻⁶ | Strength, p.s.i. | Modulus 10⁻⁶ | Percent elongation | Strength, p.s.i. | Modulus 10⁻⁶ | HDT, °F. | |
| Sample A | 45 | 12,030 | .581 | 10,550 | 1,248 | —b | 18,440 | .459 | 158 | 0.56 |
| Sample B | 45 | 14,490 | .580 | 6,160 | 0,628 | 1.1 | 20,620 | .472 | 159 | 0.24 |

It should be noted that the initial chemical thickening which occurs in the invention is not a gelation or B-stage of the resin. Such gelation or B-stage is by definition indicative of the vinyl copolymerization between the unsaturated portion of the condensation polymer or unsaturated polyester and the vinyl aryl monomer. The unsaturated polyester and vinyl aryl monomer portions of the chemically thickened resin system of the invention remain, for example, completely soluble in acetone until the subsequent cure of the polyester is initiated by the peroxide catalyst or other free radical generating means. Gelled or B-stage polyester resins, in contrast, are not entirely soluble in acetone, which insolubility is indicative of the presence of vinyl copolymerization.

The invention will be more completely understood by referring to the attached flow sheet and the following examples.

EXAMPLE I 100 grams of a general-purpose polyester resin KOPLAC 2000 (comprising a phthalic-maleic-propylene glycol polyester condensed in mole ratios of 1:1.2, dissolved in 30% by weight styrene, and having an acid number of about 25) was mixed with 1% by weight tertiary butyl peroctoate catalyst, 15 grams of N-vinylcarbazole and 1 gram of triphenyl phosphite. After thorough mixing of the ingredients, a viscosity measurement was taken on a Brookfield viscometer and the viscosity measured 13,800 centipoises. A first portion of the mixture was then set aside to determine its thickening characteristics at room temperature. A second portion was heated to 60° C. at which temperature it solidified in one hour. The first portion increased its viscosity to 45,000 centipoises in four days and in 5-6 days a solid formed. Both portions were then cured at 135° C. for one hour to give a hard clear casting.

EXAMPLE II

Following the procedure of Example I, the two additional mixtures, each containing 100 grams of KOPLAC 2000 and 1% by weight tertiary-butyl peroctoate were prepared. To the first sample (sample A) was added 5 grams N-vinylcarbazole and 1 gram of triphenyl phosphite while to the second sample (sample B) was added 10 grams of N-vinylcarbazole and 4 grams of triphenyl phosphite. The viscosity of the two samples were initially measured—Sample A had a viscosity of 2500 centipoises and Sample B had a viscosity of 2350 centipoises. Each sample was heated to 60° C. for one hour at which time the samples solidified. One hour Thus, the invention provides an unsaturated polyester resin system capable of thickening to a solid, yet uncured and, therefore, still flexible state. The resin may be applied to a glass fiber mat and then, after solidification of the resin, the mat may be stored or further processed such as by trimming or the like to fit a mold cavity.

The use of preforms is eliminated as well as the attendant mess of coating the irregular-shaped preform with a liquid resin. More positive control of the amount of charge as well as the shape of the charge in subsequent molding and curing operations can thus be maintained resulting in higher quality finished products as well as economic savings in the amount of resin used.

What is claimed is:
1. An uncured, chemically thickened, unsaturated polyester resin prepared by the process consisting essentially of:
   (a) adding to an unsaturated polyester resin, which consists essentially of a condensate formed by condensing approximately equal molar portions of at least one dicarboxylic acid, at least a portion of which contains alpha, beta-ethylenic unsaturation, with at least one dihydric alcohol, the condensate being dissolved in at least 10% by weight based on the total weight of the polyester resin of a vinyl phenyl monomer,
      (i) 3 to 25% by weight based on the total weight of the polyester resin of N-vinylcarbazole
      (ii) at least 0.5% by weight based on total weight of the polyester of triphenyl phosphite,
   (b) polymerizing catalytically the N-vinyl carbazole by said triphenyl phosphite to chemically thicken the unsaturated polyester resin.

References Cited

UNITED STATES PATENTS 2,829,120   4/1958   Parker _____ 260—865

FOREIGN PATENTS 942,297   5/1956   Germany _____ 260—864

WILLIAM H. SHORT, Primary Examiner

R. J. KOCH, Assistant Examiner

U.S. Cl. X.R.

260—862, 867, 870